United States Patent [19]
Vanicsek et al.

[11] Patent Number: 5,224,230
[45] Date of Patent: Jul. 6, 1993

[54] ROUTER-BIT DRYWALL CUTTER

[76] Inventors: Paul K. Vanicsek, 6274 W. Milden La., West Valley City, Utah 84120; James M. Green, 109 Fletcher Dr. N., Newburgh, N.Y. 12550

[21] Appl. No.: 829,307

[22] Filed: Feb. 3, 1992

[51] Int. Cl.$^5$ .............................................. B26B 11/00
[52] U.S. Cl. .......................................... 7/158; 7/165; 409/230
[58] Field of Search ................ 7/138, 142, 158, 165; 74/63; 408/20, 124, 238; 409/144, 182, 230

[56]  References Cited
U.S. PATENT DOCUMENTS

| | | | |
|---|---|---|---|
| 2,942,499 | 6/1960 | Macy | 409/230 X |
| 4,525,111 | 6/1985 | Gutsche | 7/158 X |

Primary Examiner—James G. Smith
Attorney, Agent, or Firm—Joseph B. Taphorn

[57] ABSTRACT

A standard attachment temporarily converts a drywall screw gun into a drywall router-bit cutter. Adapters unique to particular brands of screw guns may be employed to allow the standard attachment to be mounted on guns of the different brands. The attachment effects a twenty-times speed-up of the screw gun screwdriver RPMs to achieve required router-bit RPMs, while depressing a special function of the screw gun. Snap rings and snug slidable fittings are utilized to effect quick attachment/detachment. A belt clip on the attachment facilitates maintaining the attachment readily accessible. In an alternate attachment form, an external portion of the housing is substituted to allow the attachment to be mounted on guns of different brands. Different types of the attachment forms allow mounting on guns which may or may not have their depth control mechanism adjustable sleeves readily removed.

11 Claims, 5 Drawing Sheets

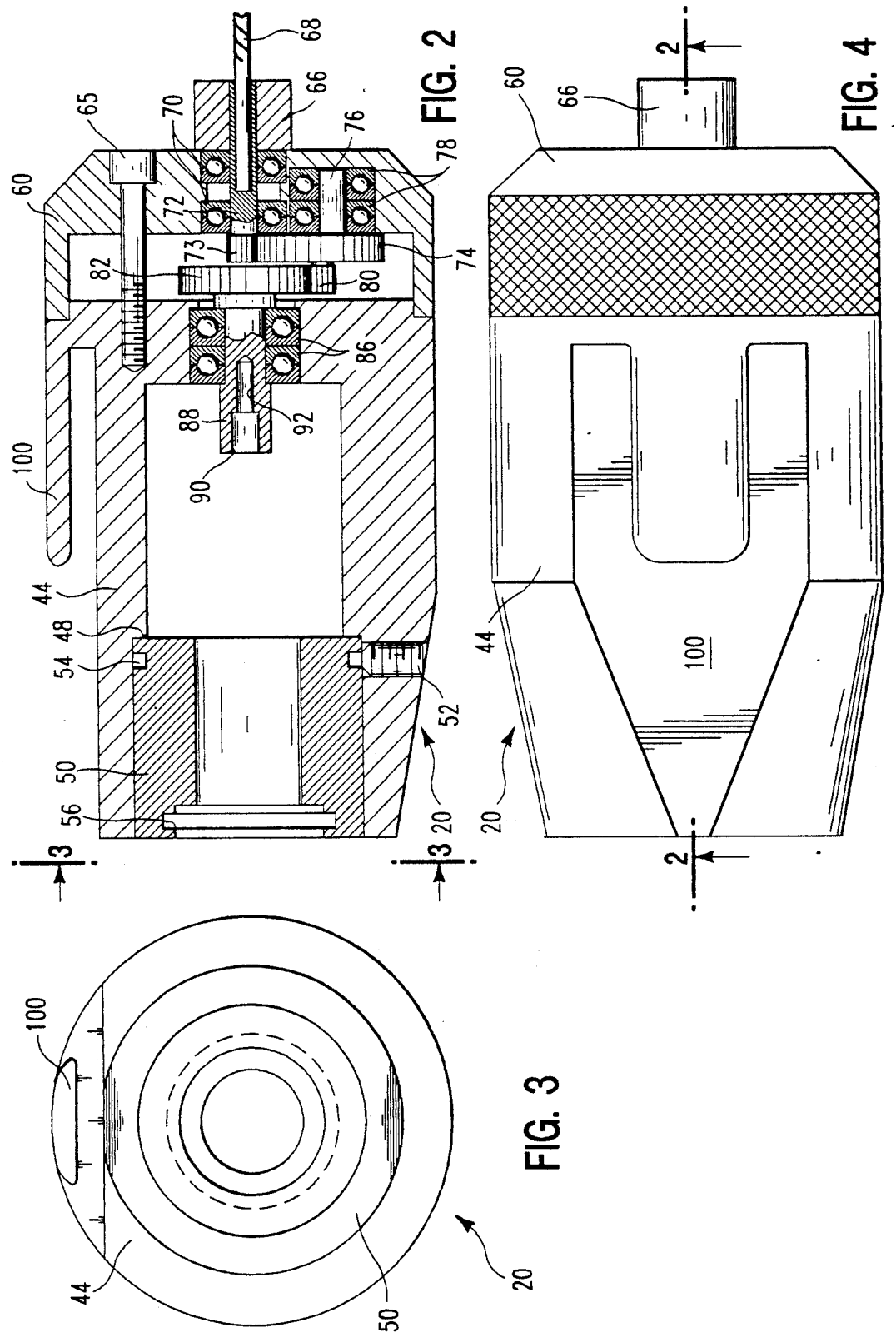

ROUTER-BIT DRYWALL CUTTER

INTRODUCTION

1. Field of the Invention

This invention relates to a router-bit drywall cutter, and more particularly to an attachment for adapting various brands of sheet rock screw guns to function as a router-bit drywall cutter.

2. Background

Separate machines constituting sheet rock or drywall screw guns and router-bit drywall cutters are well known. Each has its own heavy motor and cumbersome cord and high cost, and the second machine is an additional burden for the worker to lug around.

The drywall installation and taping industry is highly competitive and labor intensive. Cutting-out and fitting around switches, light fixtures, and electrical outlets by measuring and cutting prior to placing on the wall is slow and inaccurate, frequently requiring rework and spackling and taping of large gaps.

In the past few years a new system has developed wherein drywall sheets are screwed in place, and a thin ($\frac{1}{8}$" diameter) high speed router-bit tool is used to penetrate the sheet, and by feel against the fixture, used to trace the fixture. This makes the cut fast and neat and accurate, with minimal gap and few mistakes. One of the popular electric-motor tools being used for this purpose is the "Roto Zip Reem Mach".

The use of screw guns to secure drywalls started about the same time. A screw gun was developed using a "Philips Head" magnetized screwdriver bit carried on a normally drivingly-disconnected spindle. The spindle is clutched upon the spindle being moved inward of the gun when the screw, being held on the bit by the magnetization, is pressed against a drywall. The spindle declutches to stop its rotation after an inwardly and outwardly adjustable sleeve of a depth control mechanism and about the spindle strikes the drywall and the screw and spindle advance to the spindle declutches, the screw then having been set to the desired recess or depth. The declutching mechanism provided a faster drywall securing system, and the proper recess depth reduced spackling time. Electric screw guns are made by various manufacturers including Black & Decker, Portable, Milwaukee, Hitachi, Mikita, etc. Each has different mechanism for the depth setting, but they all use the same Philips Head bit with a $\frac{1}{4}$" hexagon shank on an inwardly displaceable spindle.

Thus the dry-wall installation system has required the use of multiple electrical tools—one the screw gun, the other the router. Some of the drawbacks with using multiple electric tools are not only their bulk, expense and electrical outlet requirements, but the fact that each requires a cord and an electric motor which create awkward obstructions, especially to other tradesmen involved with the same work space. Battery-operated tools are available, but they are weak, slow and clumsy.

SUMMARY OF THE INVENTION

Accordingly, it is an object of the invention to facilitate the installation of drywalls.

Another object of the invention is to reduce the number of complications in building new structures involving drywalls.

Still another object of the invention is to ease the installer's job in securing drywalls in place.

A further object of the invention is to reduce the installer's burden in lugging tools from job to job.

A still further object of the invention is to reduce the expenditures for tools that a drywall installer or mechanic must utilize.

Yet another object of the invention is to provide the drywall installer or mechanic with a substitute tool that is easy to use.

A yet further object of the invention is to provide a substitute tool that is adaptable to a wide variety of screw guns.

The objects of the invention are accomplished by the invention of a screw gun attachment device that provides a high speed router-bit or cutout that eliminates the need for a second cord and motor tool. An advantage of the invention is that it allows the mechanic to use a high speed router-bit or cutout without having to locate an extra electrical tool; the router-bit is just taken from the mechanic's workbelt and snapped onto the screw gun he is already using.

Screw guns usually have a 4,000 to 6,000 RPM motor whose output RPMs are reduced by gearing to 1,000 RPM or below for the screw bit, to increase torque and make the screwing operation manageable. However router-bits require a speed of 20,000 RPMs or more. While it is possible to develop alternate additional gearing as part of the screw gun that would provide the necessary router-bit speed of 20,000 RPMs or more (see for example U.S. Pat. No. 1,815,032 "Change Speed Gearing"), this adds weight and bulk to the mechanic's principal tool (screw gun). Designers have gone to great lengths to keep the screw gun light and well-balanced because of the long hours of use and resulting fatigue. And the mechanic would still have to detach the "Philips Head" screwdriver bit and attach the router-bit. Applicant has developed speed-up gearing which is part of the attachment and hence not adding weight to the more frequently used screw gun.

A feature of the attachment device is that it uses the hexagon shank of the "Philips Head" bit that is already in place on the screw gun for its drive coupling. The shank of a screw gun standard "Philips Head" screwdriver bit is hexagonal in cross-section, and a sliding connection may be made therewith to obtain the driving input for the attachment and its router bit.

Another feature of the invention is that the attachment device performs the function of depressing the screw gun spindle and clutching it, causing the screwdriver bit, when the screw gun motor is activated, to turn and drive a gear cluster to provide the RPMs necessary to operate properly the router bit (high speeds of 20,000 RPMs or more).

Applicant's attachment can be of two substitutional forms. In one, internal adapters are substituted which render a standard housing attachment device suited to any of a wide variety of screw guns. Thus an adapter is provided for each of a variety of screw guns that a mechanic might use. The adapter is inserted into the attachment device to render it specific to the individual dimensions of the particular brand of screw gun he is using.

In the other substitutional form, a portion of the external housing of the attachment device is substituted to suit the attachment device to a particular variety of screw gun. The advantage here is that the device housing portions can readily be injection molded for a smaller, lighter, and more inexpensive attachment device.

Each of the substitutional attachment devices may be also two types. For some screw guns, like the Black & Decker, it is simpler to pull off the adjustable sleeve and snap on the attachment device. For others, like the Makita, it is easier to apply the attachment device over the adjustable sleeve. Thus according to the type, the attachment device will be mounted upon the adjustable sleeve or upon another portion of the screw gun.

BRIEF DESCRIPTION OF DRAWINGS

These and other objects, features, and advantages of the invention will become apparent from a reading of the following description of the invention, when considered with the accompanying drawings wherein:

FIG. 2 is a side, partially sectional, view of just the attachment of FIG. 1;

FIG. 3 is a view of the left hand end of the attachment of FIG. 2;

FIG. 4 is a view of the top of the attachment of FIG. 2;

DETAILED DESCRIPTION OF PREFERRED EMBODIMENTS OF THE INVENTION

Figure 1:
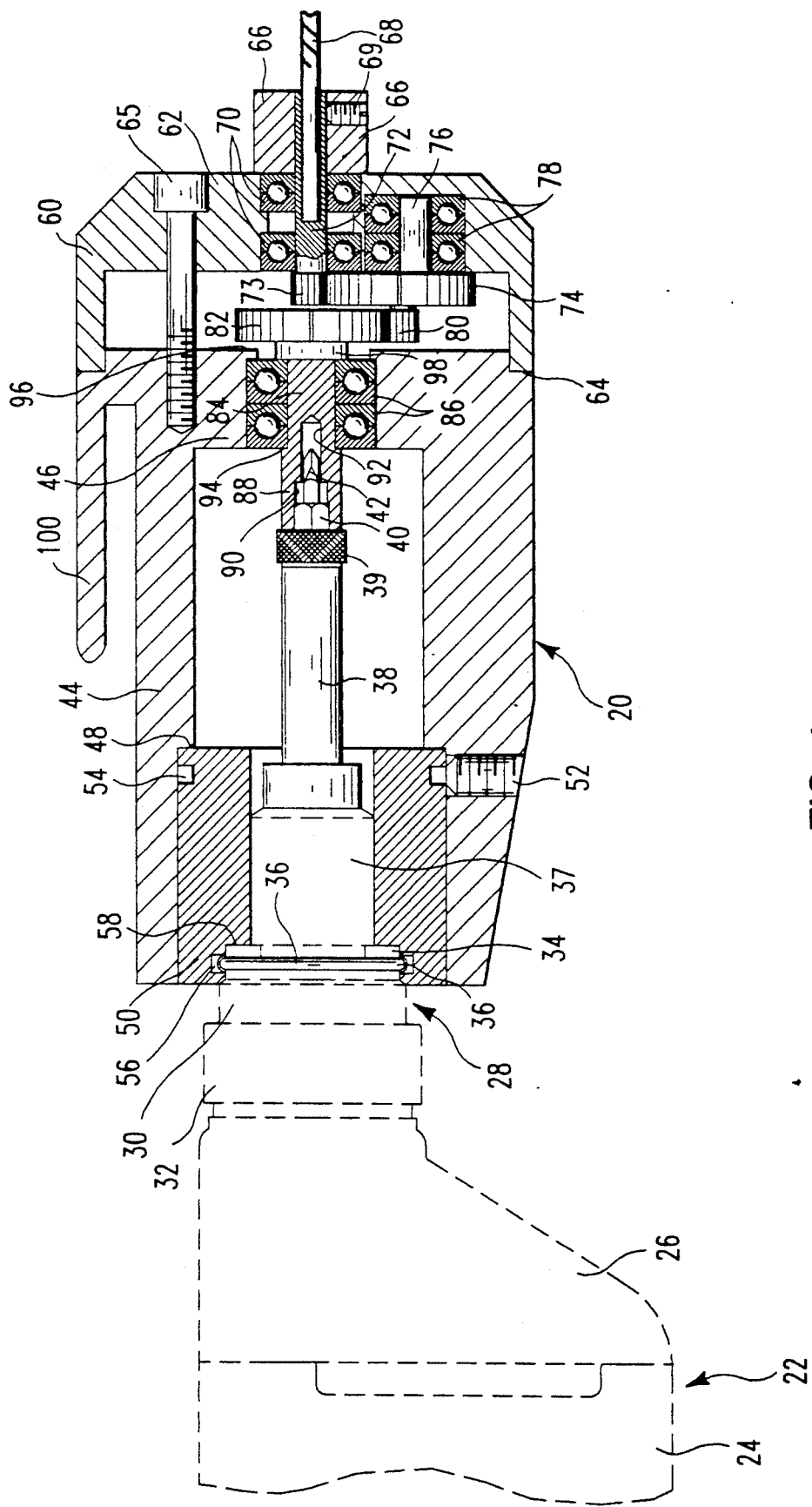
FIG. 1 is a side, partially sectional schematic view of an adapter substitutional attachment device suited to a Black & Decker Drywall Screw Gun whose adjustable sleeve mechanism has been removed.

Referring now particularly to FIGS. 1-4 of the drawings, there is shown in FIG. 1 a router-bit attachment of the adapter substituting form and generally indicated by the numeral 20, mounted on a screw gun (Black and Decker), generally indicated by the numeral 22, whose depth control or adjustable sleeve mechanism has been removed. The screw gun 22 includes a conventional motor housing 24 mounting on its front end a conventional gear reducer housing 26 mounting on its front end a clutchable spindle and screwdriver assembly, generally indicated by the numeral 28, (minus an adjjustable sleeve which has been removed for mounting the router-bit attachment 20).

The clutchable spindle and screwdriver assembly 28 includes a cylinder 30 embraced by a cylindrical nut 32. A nut (not shown) on the sleeve is operative to adjust the depth at which the adjustable sleeve (not shown) is effective to allow declutching of the spindle and screwdriver assembly when a screw reaches a pre-determined depth. The outer end of the cylinder 30 has a reduced portion 34 with which it forms a shoulder, and the reduced portion 34 is formed with an annular groove containing a snap ring 36 for readily mounting the adjustable sleeve (not shown). Extending outward from the front end of the cylinder 30 is a reduced cylinder 37 and a retaining nut from which projects a spindle 38 whose front end receives and secures, by means of the chuck nut 39, the hexagonal shank 40 of a Philips Head screwdriver bit 42. When the screwdriver is not pressuring a screw, the screwdriver is at rest even when the screw gun motor is running. Upon applying pressure to a screw, the spindle 38 and screwdriver 42 are displaced axially to clutch the spindle to the motor reduction gearing and rotate it and the screw driver. Rotation normally continues until the adjustable sleeve strikes the drywall and the screw and spindle thereafter advance to where the spindle declutches, which normally is the point at which the screw has reached a predetermined depth into the drywall.

The router-bit attachment 20 includes a generally cylindrical shell 44 open at its inner end and formed with an inturned portion 46 at its other. The interior of the open end is of slightly larger diameter than the rest to form a shoulder at 48 constituting a stop for an adapter 50 for mounting the attachment 20 on a particular brand of screw gun, here shown to be a Black and Decker one. The adapter is snugly yet slidably received within the open end; it is held in there and against the shoulder by a set screw 52 threadedly mounted in the lower side of the shell 44 and cooperating with an annular groove 54 in the adapter.

The walls of the adapter 50 are of a thickness to snugly yet slidably embrace the reduced cylinder 37 and thereby provide mounting stability for the router-bit attachment 20. The attachment 20 is further held in place by an annular groove 56 formed in the periphery of a cut-away portion 58 at the inner end of the adapter 50 and snugly yet slidably receiving the reduced portion 34 of the cylinder 30 of the screwdriver assembly 28. The annular groove 56 receives the screw-gun snap ring 36 when the adapter 50 mounted on the router-bit attachment 20 is slid over the depth adjustment nut 37 to where a shoulder formed on the adapter by the cut-away portion 58 engages the free end of the reduced portion 34 and inner end of the adapter engages the shoulder formed between the cylinder 30 and its reduced portion 34. The router-bit attachment 20 is thus rigidly held in place on the screw gun 22.

The outer end of the router-bit attachment 20 includes a short, cylindrical speed-up gearing housing 60 having an end wall 62. The housing 60 is seated on the shell 44 in a recess 64 and secured thereto by bolts 65.

The end wall 62 mounts a chuck 66 for holding a high-speed router-bit 68 by a set screw 69, via a pair of radial bearings 70 seated in a central opening thereof and engaging the shaft 72 of the chuck 66. The inner end of the shaft 72, which projects beyond the inside of the end wall 62, is formed into a pinion gear 73. Pinion gear 73 is driven by a spur gear 74 fixed to a shaft 76 trunnioned at its outer end in a pair of radial bearings 78. The inner end of the shaft 76, projecting beyond the spur gear 74, is formed as a pinion gear 80. Pinion gear 80 is driven by a spur gear 82 fixed to an inwardly extending shaft 84 mounted on a pair of radial bearings 86 fixed in a central opening in the inturned portion 46 of the outer generally cylindrical shell 44. The gearing effects a speed change from the one-thousand or so RPMs of the screwdriver 42 to the required twenty-thousand or more RPMs of the router-bit 68.

The shaft 84 effects the driven connection for the router-bit 68 with the screw gun 22. To this end, it is formed on its inner end with an enlarged portion 88 hollowed out as at 90 in a hexangonal shape to slidably yet snugly receive fully the extending portion of the hexagonal shank 40 of the Philips Head screwdriver 42. The interior end of the hollowed out enlarged portion 88 is further recessed, at 92, to slidably yet snugly receive the screwdriver bit 42 to provide a further stabilizing effect agains vibration. A shoulder 94, formed at the juncture of the shaft 84 with its enlarged portion 88, prevents outward movement of the shaft 84 by engaging the inner bearing race of one of the pair of juxtaposed radial bearings 86. Outward movement of the pair of radial bearings 86 is precluded by engagement of the outer race of the other bearing of the pair by a radially-inwardly-directed shoulder or flange 96. A collar 98 formed on the inner side of the spur gear 82 insures its space from the inturned portion 46.

The shaft 84 also is of a length to effect a inward or axial displacement of the screwdriver 42 and spindle 38 to clutch them for rotation upon mounting of the attachment 20. Thus the shaft enlarged portion 88 is of a length to hold the spindle in its left-most (FIG. 1) or clutched position while the attachment 20 is mounted, and hence the router-bit 68 will normally rotate when the screw gun trigger (not shown) is actuated.

As observed earlier, a feature of this invention is that the screw gun router-bit attachment can be carried on the belt of of the workman. To this end, the generally cylindrical shell is formed on one side with a spaced portion 100 constituting a belt clip. When the router-bit attachment 20 is not mounted on the screw gun 22, the workman may carry it on his belt for immediate accessibility for mounting on the screw gun 22.

Figures 5, 6:
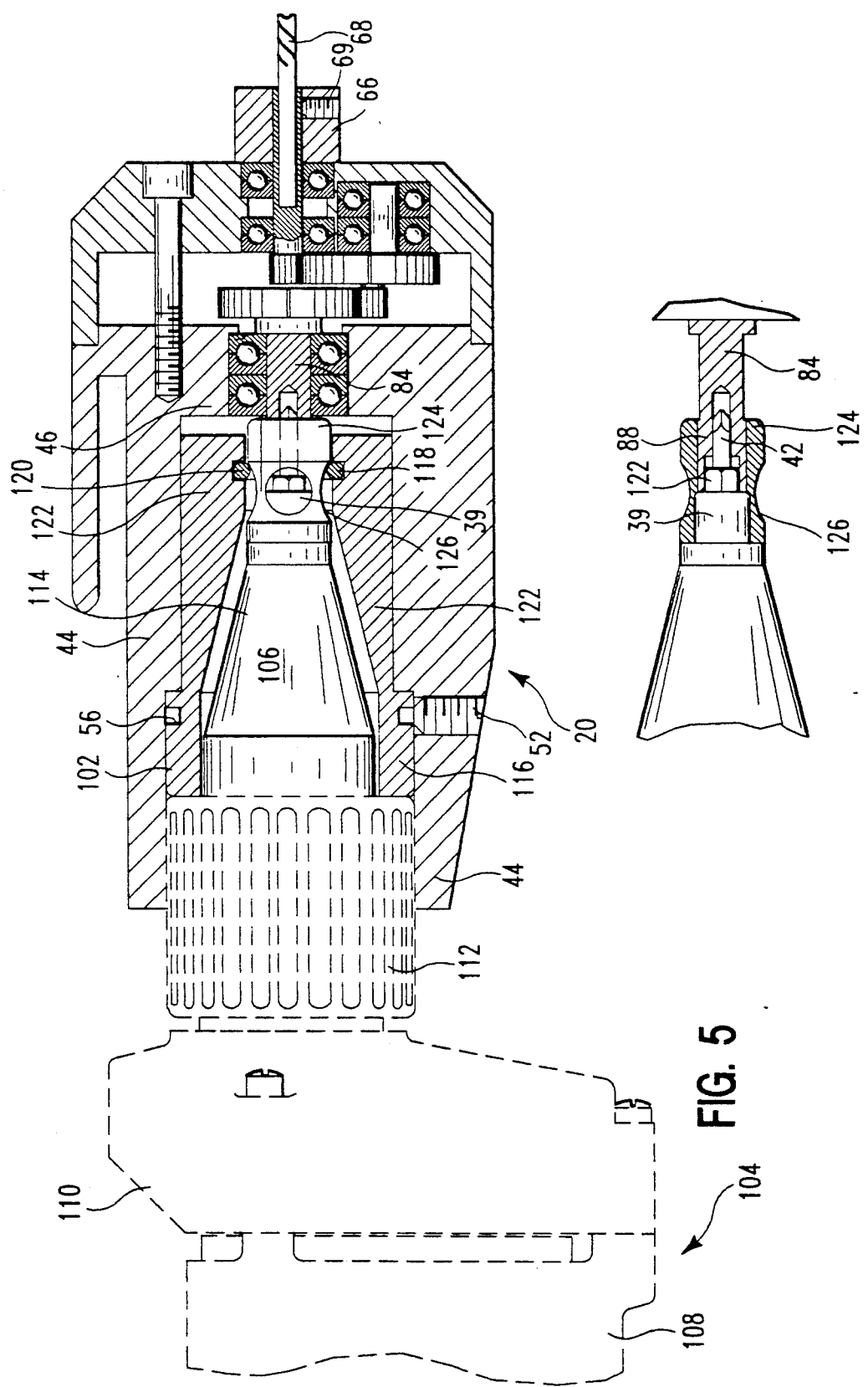
FIG. 5 is a side, partially sectional, schematic view of the adapter substitutional attachment device suited to a Mikita Drywall Screw Gun with its adjustable sleeve mechanism in place.
FIG. 6 is an enlarged side, partially sectional, schematic view of a portion of the gun and attachment of FIG. 5 and showing details of the drive interconnection.

Referring now to FIGS. 5 and 6, there is shown therein the router-bit attachment 20 of FIGS. 1-4, except for a modified adapter 102. The modified adapter accommodates a screw gun, generally indicated by the numeral 104, wherein it is more convenient to leave the adjustable sleeve of a depth control mechanism, generally indicated by the numeral 106, in place. Such a screw gun is marketed by MAKITA.

The MAKITA screw gun 104 includes the conventional motor housing 108, gear reducer housing 110, and spindle chuck nut 39 receiving and securing the shank 40 of the conventional Philips Head screwdriver 42. The depth control mechanism 106 includes an increased-length cylindrical adjustment nut 112, and a displaceable sleeve 114 embracing at its outer end the enlarged portion 88 of the shaft 84 making the router-bit 68 driven connection with the screw gun 104. In normal screw gun use, as a screw penetrates a dry wall a predetermined distance as determined by the setting of the adjustable sleeve 114 by depth adjustment nut 112, the spindle declutches from the drive train in the gear reducer housing 110.

The MAKITA brand screw gun requires a modified adapter 116 to be employed. This adapter 116, and hence the router-bit attachment, is mounted on the screw gun in part, not by using a screw-gun snap ring for the depth adjustment mechanism, but rather by using a snap ring 118 carried in an interior annular groove 120 on an extension 122 of the adapter. The snap ring 118, in the mounted position of the attachment 20, seats behind a head 124 and in a well-rounded annular groove 126 formed behind the head 124 on the end of the adapter extension 122. The inner end of the adapter has an internal dimension such that it snugly yet slidably received on the non-conical or cylindrical inner end of the sleeve 114. As before, the adapter 116 is secured within the attachment 20 through the annular groove 56 cooperating with the set screw 52 in the shell 44. In mounting the attachment device 20 on the MAKITA screw gun, the open end of the shell 44 is moved on the screw gun to where it is received on the adjustment nut 112, the inner end of the adapter 102 is seated on the cylindrical portion of the sleeve 114, and the snap ring 118 has slid over the head 124 and expanded down into the well rounded groove 126. Between the snug contact between the adapter 102 and the cylindrical portion of the sleeve 106, and the snap ring 120 groove engagement behind the sleeve head 124, the attachment 20 is amply secured to the screw gun 104.

Figure 7:
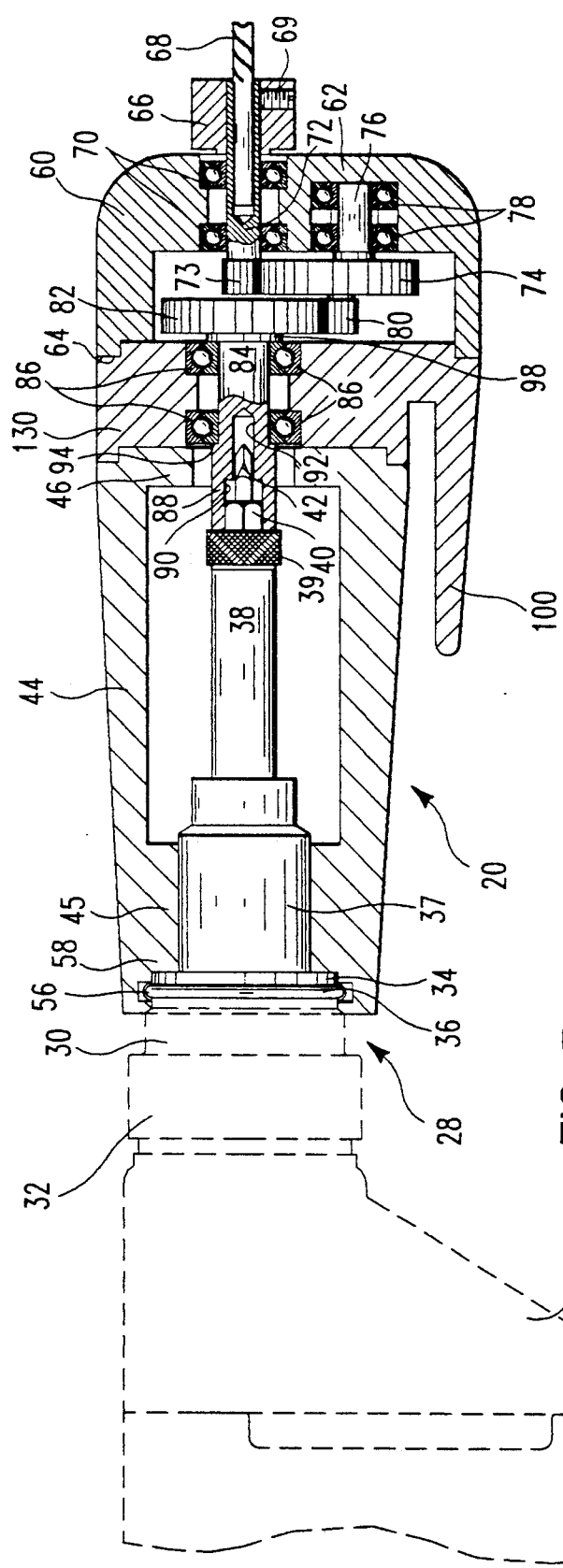
FIG. 7 is a side, partially sectional schematic view of an attachment device wherein a portion of the external housing of the attachment has been substituted to suit it to the Black & Decker Drywall Screw Gun whose adjustable sleeve has been removed.
Figure 8:
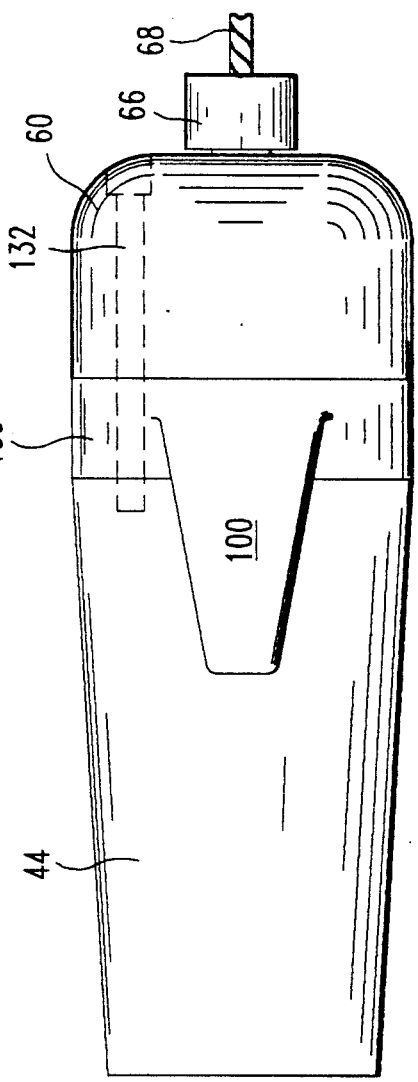
FIG. 8 is a bottom view of the attachment of FIG. 7.

Referring now particularly to FIGS. 7 and 8 of the drawings, there is shown in FIG. 7 a router-bit attachment device of the external housing portion substituting form, generally indicated by the numeral 20, and adapted to a screw gun (Black and Decker) generally indicated by the numeral 22, whose depth control mechanism adjustable sleeve has been removed. The screw gun 22 includes a conventional motor housing 24 mounting on its front end a conventional gear reducer housing 26 mounting on its front end a clutchable spindle and screwdriver assembly, generally indicated by the numeral 28, (minus a depth control mechanism adjustable sleeve which has been removed for mounting the router-bit attachment 20).

The clutchable spindle and screwdriver assembly 28 includes a cylinder 30 embraced by a cylindrical nut 32. (Another nut is) operative to adjust the depth at which the depth adjustment mechanism is effective to declutch the spindle and screwdriver assembly when a screw reaches a predetermined depth. The outer end of the cylinder 30 has a reduced portion 34 with which it forms a shoulder, and the reduced portion 34 is formed with an annular groove containing a snap ring 36 for readily mounting the depth control mechanism. Extending outward from the front end of the cylinder 30 is a reduced cylinder 37 and a retaining nut from which projects a spindle 38 whose front end receives and secures, by means of the chuck nut 39, the hexagonal shank 40 of a Philips Head screwdriver bit 42. When the screwdriver is not applied to a screw, the screwdriver is at rest even when the screw gun motor is running. Upon applying pressure to a screw, the spindle 38 and screwdriver 42 are displaced axially to clutch the spindle to the motor reduction gearing and rotate it and the screw driver.

The router-bit attachment 20 includes a inner end generally cylindrical injection-molded shell 44 open at its inner end or left-hand (FIG. 7) end 45 which is of increased thickness and shaped internally to snugly, yet slidably be received upon the screw gun spindle and screwdriver assembly cylinder reduced end portion 34 and reduced cylinder 37. The outer or right hand end (FIG. 7) of the shell 44 is formed with an inturned portion 46. The interior of the open end of the shell 44 is thus of a shape for mounting the attachment 20 on a particular brand of screw gun, here shown to be a Black and Decker one. The shell 44 is snugly yet slidably received on a particular screw gun spindle and screwdriver assembly 28.

The attachment 20 is further held in place by an annular groove 56 formed in the periphery of a cut-away portion 58 at the inner end of the of the inner end 45 and snugly yet slidably receiving the reduced portion 34 of the cylinder 30 of the screwdriver assembly 28. The annular groove 56 receives the screw-gun snap ring 36 when the shell 44 of the router-bit attachment 20 is slid over the depth adjustment nut 37 to where a shoulder formed on the inner end 45 by the cut-away portion 58 engages the free end of the reduced portion 34, and the inner end of the inner end 45 engages the shoulder formed between the cylinder 30 and its reduced portion 34. The router-bit attachment 20 is thus rigidly held in place on the screw gun 22.

The router-bit attachment 20 also includes an intermediate portion 130 and an end or cap portion 60, all secured together by screws 132 (FIG. 8) threadedly received in the shell 44. The intermediate portion supports the main bearings 86 for the speed-up gearing in the attachment 20.

The outer end or cap portion or housing 60 of the router-bit attachment 20 includes an end wall 62. The housing 60 is seated on the intermediate portion in a recess 64 and secured thereto and the shell 44 by the bolts 132.

The end wall 62 mounts a chunk 66 for holding a high-speed router-bit 68 by a set screw 69, via a pair of radial bearings 70 seated in a central opening thereof and engaging the shaft 72 of the chuck 66. The inner end of the shaft 72, which projects beyond the inside of the end wall 62, is formed into a pinion gear 73. Pinion gear 73 is driven by a spur gear 74 fixed to a shaft 76 trunnioned at its outer end in a pair of radial bearings 78. The inner end of the shaft 76, projecting beyond the spur gear 74, is formed as a pinion gear 80. Pinion gear 80 is driven by a spur gear 82 fixed to an inwardly extending shaft 84 mounted on a pair of radial bearings 86 fixed in a central opening in the intermediate portion 130. The gearing effects a speed change from the one-thousand or so RPMs of the screwdriver 42 to the required twenty-thousand or more RPMs of the router-bit 68.

The shaft 84 effects the driven connection for the router-bit 68 with the screw gun 22. To this end, it is formed on its inner end with an enlarged portion 88 hollowed out as at 90 in a hexagonal shape to slidably yet snugly receive fully the extending portion of the hexagonal shank 40 of the Philips Head screwdriver 42. The interior end of the hollowed out enlarged portion 88 is further recessed, at 92, to slidably yet snugly receive the screwdriver bit 42 to provided a further stabilizing effect against vibration. A shoulder 94, formed at the juncture of the shaft 84 with its enlarged portion 88, prevents outward movement of the shaft 84 by engaging the inner bearing race of one of the pair of juxtaposed radial bearings 86. A collar 98 formed on the inner side of the spur gear 82 insures its space from the inturned portion 46.

The shaft 84 also is of a length to effect a inward or axial displacement of the screwdriver 42 and spindle 38 to clutch them for rotation upon mounting of the attachment 20. Thus the shaft enlarged portion 88 is of a length to hold the spindle in its left-most (FIG. 7) or clutched position while the attachment 20 is mounted, and hence the router-bit 68 will normally rotate when the screw gun trigger (not shown) is actuated.

As observed earlier, a feature of this invention is that the screw gun router-bit attachment can be carried on the belt of of the workman. To this end, the intermediate portion 130 is formed on one side with a spaced portion 100 constituting a belt clip. When the router-bit attachment 20 is not mounted on the screw gun 22, the workman may carry it on his belt for immediate accessibility for mounting on the screw gun 22.

Figure 9:
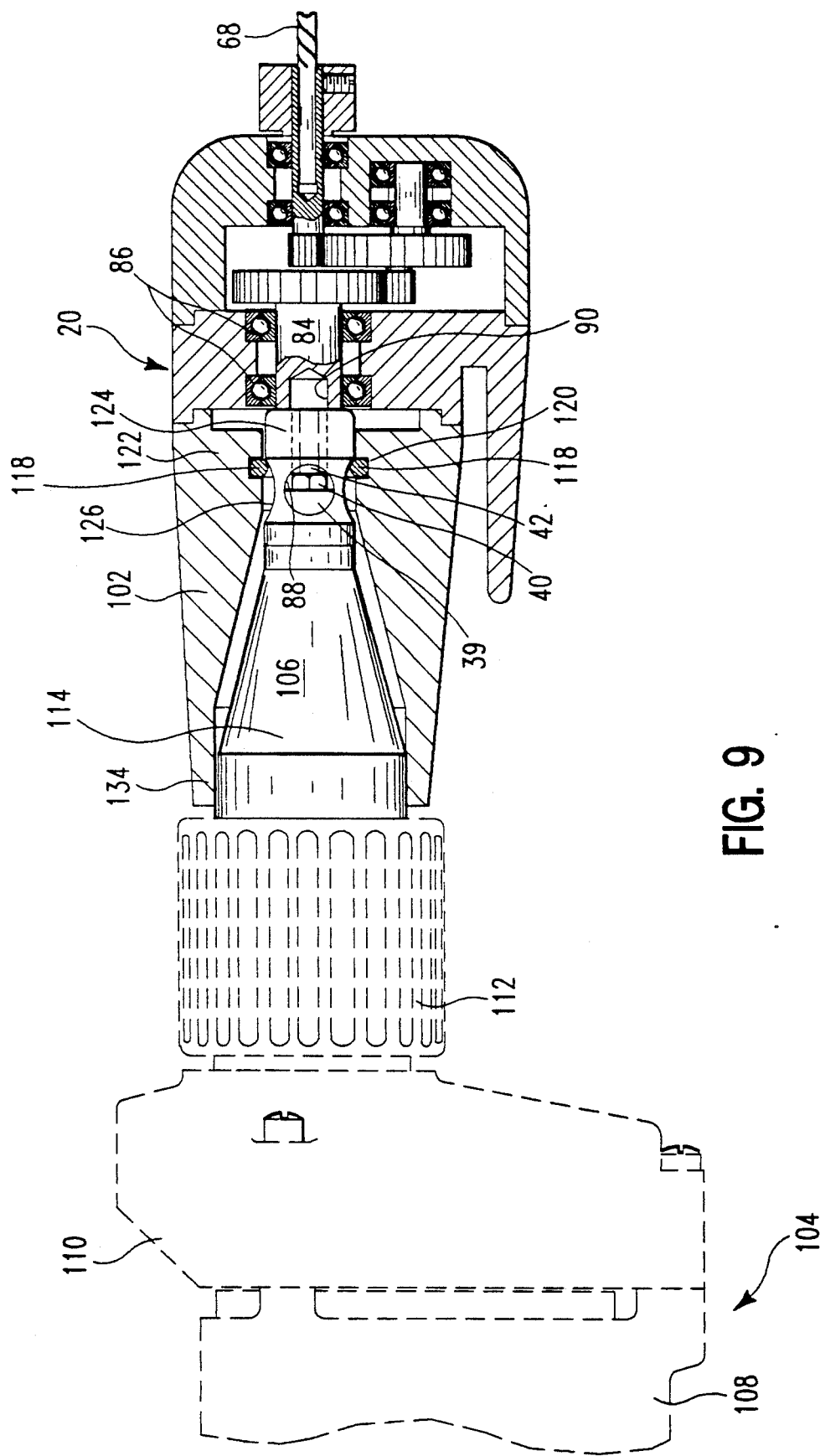
FIG. 9 is a side, partially sectional, schematic view of an attachment wherein a portion of the external housing has been substituted to suit it to a Makita Drywall Screw Gun with its adjustable sleeve in place.

Referring now to FIG. 9, there is shown therein the router-bit attachment 20 of FIGS. 7 and 8, except for a substituted and modified inner end generally cylindrical injection-moled shell 102. The modified shell accommodates a screw gun, generally indicated by the nummeral 104, wherein it is more convenient to leave the adjustable sleeve of the depth control mechanism, generally indicated by the numeral 106, in place. Such a screw gun is marketed by MAKITA.

The MAKITA screw gun 104 includes the conventional motor housing 108, gear reducer housing 110, and spindle chuck nut 39 receiving and securing the shank 40 of the conventional Philips Head screwdriver 42. The depth control mechanism 106 includes an increased-length cylindrical adjustment nut 112 and a sleeve 114 displaced thereby and embracing at its outer end the enlarged portion 88 of the shaft 84 making the router-bit 68 driven connection with the screw gun 104. In normal screw gun use, as a screw penetrates a dry wall a distance as determined by the setting of the depth adjustment nut 112, and resulting displacement of the sleeve 114, the spindle declutches from the drive train in the gear reducer housing 110 as the head 124 of the sleeve 114 strikes the drywall and the screw advances to a predetermined depth. Inward movement of the attachment is limited by the inside of the inner race of the inner bearing of the main bearings 86 striking the end face of the head 124.

The MAKITA brand screw gun requires that a modified inner cylindrical shell such as 102 be employed. This shell 102, and hence the router-bit attachment 20, is mounted on the screw gun in part, not by using a screw-gun snap ring for the depth adjustment mechanism, but rather by using a snap ring 118 carried in an interior annular groove 120 in a thicker portion 122 of the outer end of the shell 102. The snap ring 118, in the mounted position of the attachment 20, seats behind in a well-rounded annular groove 126 formed behind the head 124 fixed on the end of the sleeve 114. The inner end of the shell 102 has an internal dimension such that it is snugly yet slidably received on the non-conical or cylindrical inner end of the sleeve 114.

In mounting the attachment device 20 on the MAKITA screw gun, the open end of the shell 102 is moved on the screw gun to where it is received on the non-conical or cylindrical inner end of the sleeve 114, and the snap ring 118 has slid over the head 124 and expanded down into the well rounded groove 126. Between the snug contact between the inner end of the shell 102 and the cylindrical portion of the sleeve 106, and the snap ring 120 groove engagement behind the sleeve head 124, the attachment 20 is amply secured to the screw gun 104. It should be remembered that the router-bit 68 remains in clutched or driven engagement during router-bit operation because the shaft 84 holds the spindle 39 inwards while the attachment is mounted.

In use, a screw gun will be used in normal fashion. When it is desired to cut a drywall for a fixture, a worker will first remove the depth control mechanism adjustable sleeve for a screw gun that is designed to enable it to be easily removed, in order to obtain the advantage of reduced weight. Thereafter, or otherwise, he will remove the router-bit attachment from his belt, insert the router bit 68 in the chuck 66 and fasten the set screw 69, and then just push the interior open end of the attachment onto the screw gun until a snap ring falls in place, the action being effective to clutch the spindle for the duration of the mounting, too. Removal merely involves pulling the attachment and the screw gun apart, separation being easy once the snap ring has been forced out of its groove. On separation, the spindle is declutched again.

It will be appreciated that the worker would have previously purchased or otherwise obtained an attachment with an inner shell 102 or an adapter, suited to the particular brand of screw gun he uses. Only one such shell or adapter need be purchased to tailor the router-bit attachment to his particular screw gun.

It will also be appreciated that applicant's invention facilitates the installation of drywalls by eliminating the need for a second electric motor and its electric cord and its outlet requirements. This elimination of the second motor and particularly its cord reduces the complications in building new structures involving drywalls and eases the installer's job. The installer's burden is reduced in that he needs to lug fewer heavy tools from place to place, and his cost is reduced in that the router-bit attachment is much less expensive than an integral motor-router-bit tool.

It will be apparent that while applicant has shown preferred embodiments of his invention, that other and different applications of the principles of his invention will be apparent to those skilled in the art. It is intended accordingly to be limited only by the scope or spirit of the appended claims.

What is claimed is:

1. An attachment for converting a drywall screw gun having a driven screwdriver clutched upon forcing the screwdriver upon a screw and declutched upon rotating the screw into the drywall to a predetermined depth set by an adjustable sleeve striking the drywall, comprising a housing, a chuck for holding a router drill bit and rotatably mounted on said housing, and a power train for coupling the chuck to the driven screwdriver in the clutched position of the screwdriver, said housing including a component for fixedly attaching the attachment to a particular screw gun, wherein the screwdriver has a shank, and the power train rotatably couples to that shank, and wherein the shank has a hexangonal cross-section.

2. An attachment according to claim 1, and wherein the attachment includes structures to hold the screwdriver axially displaced in clutched position during mounting.

3. An attachment according to claim 1, wherein the power train includes a shaft of a length to hold the screwdriver in the clutched position when the housing is attached to a screw gun.

4. An attachment according to claim 1, wherein the attachment includes a clip for attaching it to a workman's belt.

5. An attachment according to claim 1, wherein the component is a portion of the outer housing.

6. An attachment according to claim 1, wherein the component is mounted on the depth control portion of the screw gun.

7. A router-bit drywall cutter, comprising a screw gun having a screwdriver clutched on pressure against a screw and declutched upon rotating the screw to a particular depth set by a sleeve striking a drywall, and an attachment including a chuck for holding a router-bit, and a power train for coupling the chuck to the screwdriver and for maintaining the screwdriver clutched.

8. A router-bit drywall cutter according to claim 7, wherein the attachment includes a housing having means configured to the screw gun for fixing the attachment to the screw gun.

9. A router-bit drywall cutter according to claim 8, wherein the housing includes an the adapter unique to a particular variety of screw gun.

10. A router-bit drywall cutter according to claim 8, wherein the housing includes a portion of the housing unique to a particular variety of screw gun.

11. A simplied method of drywall installation, comprising mounting a drywall by rotating screws through it to a desired depth by a screw gun, converting the screw gun to a router-bit drywall cutter by adding an attachment having a router-bit chuck to the gun, and cutting the drywall to trace fixtures, wherein converting the screw gun includes removing a depth control mechanism adjustment sleeve from the screw gun before adding the attachment.

* * * * *